(12) United States Patent
Olson et al.

(10) Patent No.: US 9,125,100 B2
(45) Date of Patent: Sep. 1, 2015

(54) DEVICE NETWORK FOOTPRINT MAP AND PERFORMANCE

(71) Applicant: Verizon Patent and Licensing Inc., Basking Ridge, NJ (US)

(72) Inventors: Brian Olson, Clayton, CA (US); Benjamin J. Parker, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 227 days.

(21) Appl. No.: 13/649,642

(22) Filed: Oct. 11, 2012

(65) Prior Publication Data

US 2014/0106736 A1    Apr. 17, 2014

(51) Int. Cl.
*H04W 24/10*    (2009.01)
*H04W 64/00*    (2009.01)

(52) U.S. Cl.
CPC .............. *H04W 24/10* (2013.01); *H04W 64/00* (2013.01)

(58) Field of Classification Search
CPC ............ H04L 41/5009; H04L 41/5035; H04L 43/067; H04W 24/00; H04W 24/02; H04W 24/08
See application file for complete search history.

(56) References Cited

U.S. PATENT DOCUMENTS

| | | | |
|---|---|---|---|
| 8,903,401 B2* | 12/2014 | Fujito et al. | 455/438 |
| 2005/0207349 A1* | 9/2005 | Nagami et al. | 370/241 |
| 2006/0271517 A1* | 11/2006 | Deloach | 707/3 |
| 2007/0067373 A1* | 3/2007 | Higgins et al. | 707/206 |
| 2008/0144534 A1* | 6/2008 | Gross | 370/257 |
| 2008/0151774 A1* | 6/2008 | Vogel et al. | 370/252 |
| 2011/0145405 A1* | 6/2011 | Vijayaraghavan | 709/224 |
| 2011/0320588 A1* | 12/2011 | Raleigh | 709/224 |
| 2012/0002555 A1* | 1/2012 | Ohuchi et al. | 370/244 |
| 2012/0071174 A1* | 3/2012 | Bao et al. | 455/456.3 |
| 2012/0194520 A1* | 8/2012 | Nordfelth et al. | 345/440 |
| 2014/0057626 A1* | 2/2014 | Uelk et al. | 455/423 |

* cited by examiner

*Primary Examiner* — Liton Miah (57) ABSTRACT

A first server may: receive information regarding a user device from a second server; store the information regarding the user device to form device data; determine one or more connection durations based on the device data, each one of the one or more connection durations relating to a time duration in which the user device connects to one of the one or more network devices; receive, from the second server, performance data associated with each one of the one or more network devices; receive, from a client device, a query including a request for a performance indicator of the user device; generate the performance indicator based on the performance data and based on the one or more connection durations corresponding to the each one of the one or more network devices; and provide the performance indicator to the client device based on receiving the query.

20 Claims, 6 Drawing Sheets

Fig. 6

DEVICE NETWORK FOOTPRINT MAP AND PERFORMANCE

BACKGROUND

Users sometimes use user devices to perform some task (e.g., sending and/or receiving electronic mail (e-mail) messages, placing telephone calls to other user devices, browsing the internet, etc.). User devices sometimes connect to a cellular network, via one of multiple base stations, to send and receive data associated with performing a task. Determining user device network performance and information regarding geographical locations of the user device may be cumbersome and inaccurate when the user device relocates to different geographic areas associated with different base stations of the cellular network.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a geographic connection profile (e.g., a network footprint) of a user device. The systems and/or methods may also provide information regarding the network performance of the user device based on the network footprint. For example, the systems and/or methods may generate the network footprint of the user device in the form of a graphical representation (e.g., a map) relating to connection durations between a user device and particular base stations (e.g., base stations associated with particular geographic regions), associated with a cellular network. In some implementations, the network footprint may also relate to durations in which an application of the user device is used (e.g., a calling application, a web browsing application, a video streaming application or some other application).

Additionally, or alternatively, the systems and/or methods may provide the network footprint of the user device and/or the information regarding the network performance of the user device to a client device. In some implementations, troubleshooting, network diagnostics, network planning, business planning (e.g., targeted selling), business processes, customer service processes (e.g., churn abatement, customer care processes), and/or service quality metrics may be determined based on information regarding a network footprint of a user device and/or information regarding the network performance of the user device.

In some implementations, a particular designation of a base station (e.g., a "stationary" base station a "mobile" base station, etc.) may be determined based on the network footprint and/or application activity associated with the network footprint. For example, a stationary base station may correspond to a base station in which user devices place a call and terminate a call using the same base station whereas a "mobile" base station may correspond to a base station in which user devices places a call and terminates a call using some other base station.

Figure 1:
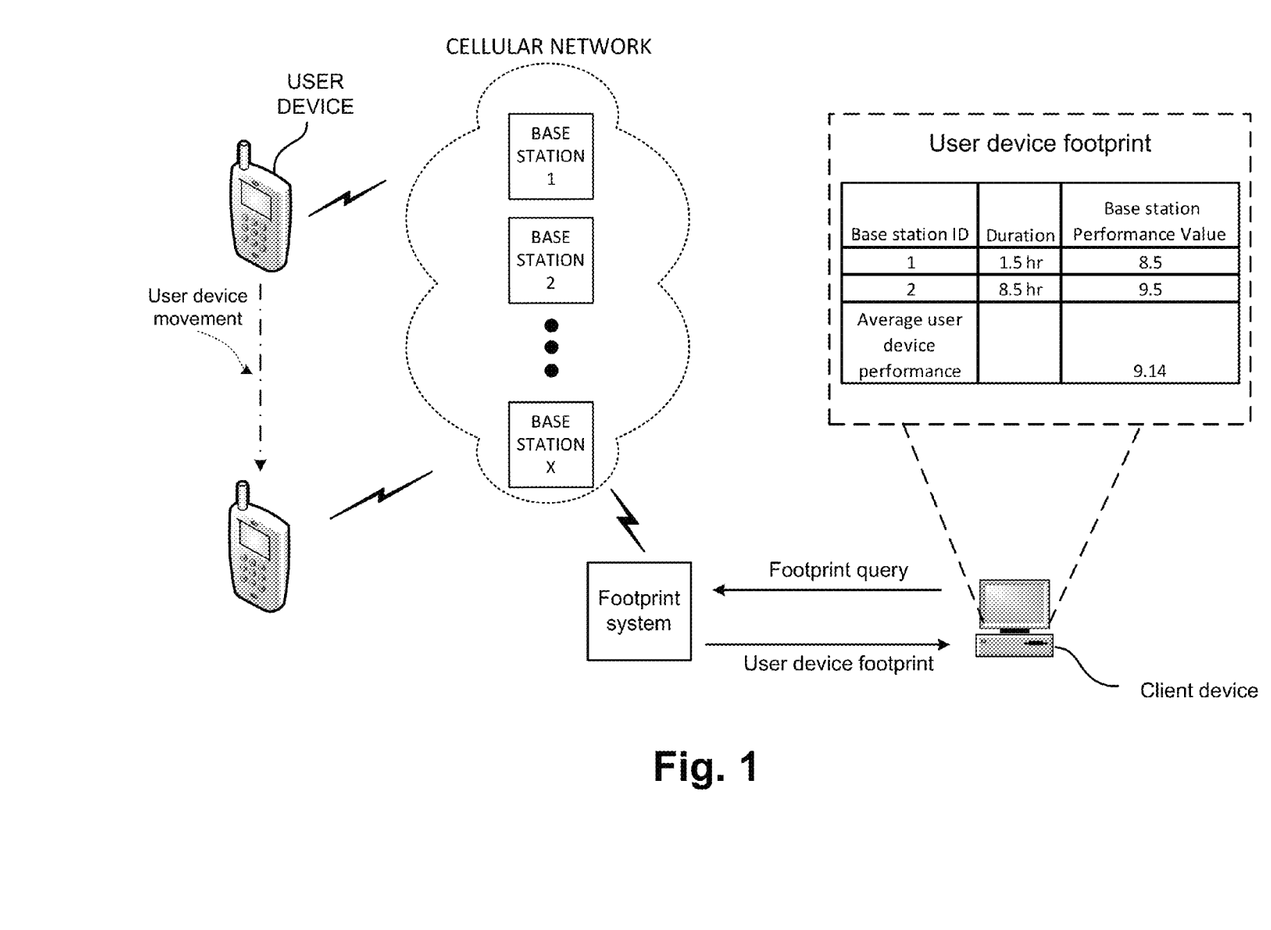
FIG. 1 illustrates an example overview of an implementation described herein.

FIG. 1 illustrates an example overview of an implementation described herein. As shown in FIG. 1, a user device may communicate with one of multiple base stations, associated with a cellular network, to perform some task via the cellular network (e.g., send and/or receive e-mail, place a telephone call to another user device, browse the internet, etc.). In some implementations, a user device may connect with a first base station, associated with a first geographic region, and may disconnect from the first base station and connect to a second base station associated with a second geographic region (e.g., when the user device relocates from the first geographic region to the second geographic region).

In some implementations, a footprint system may receive information regarding the user device, such as a mobile device number (MDN) of the user device, an international mobile equipment identity (IMEI) number, a mobile equipment identifier (MEID), or some other identifier associated with the user device. Further the footprint system may also receive information regarding the base station(s), such as identifiers of the particular base station(s) with which the user device is connected (e.g., a sector identifier, a cell identifier, or some other identifier associated with the base station), timestamps relating to when the user device connects to the base station(s), performance data associated with the base station(s), etc. Additionally, the footprint system may generate a performance value of the base station(s) based on the performance data. For example, the footprint system may generate a performance value on a relative scale of 1-10 (e.g., where a value of 10 indicates highest quality performance and 1 indicates low quality performance) which may be based on network outage data, network speed data, network latency data, etc. associated with the base station(s).

In some implementations, the footprint system may receive a footprint query, relating to the user device, from a client device and may determine a network footprint, for the user device, based on receiving the footprint query. For example, and as shown in FIG. 1, the footprint system may generate a network footprint in the form of a chart that identifies base stations with which the user device connects, time durations in which the user device connects to the base stations, performance values for the base stations, and an average user device performance value. Additionally, or alternatively, the footprint system may generate a network footprint in the form of a geographic map identifying base stations with which the user device connects and time durations in which the user device connects to the base stations.

While implementations of a network footprint described herein may be described in terms of time durations in which a user device is connected to base stations having respective performance values, in practice, the network footprint is not so limited. For example, the network footprint may describe time durations in which a user device is performing a particular type of task (e.g., placing voice calls, browsing the internet, running a particular software application, etc.) and/or performance values associated with performing a particular task.

Figure 2:
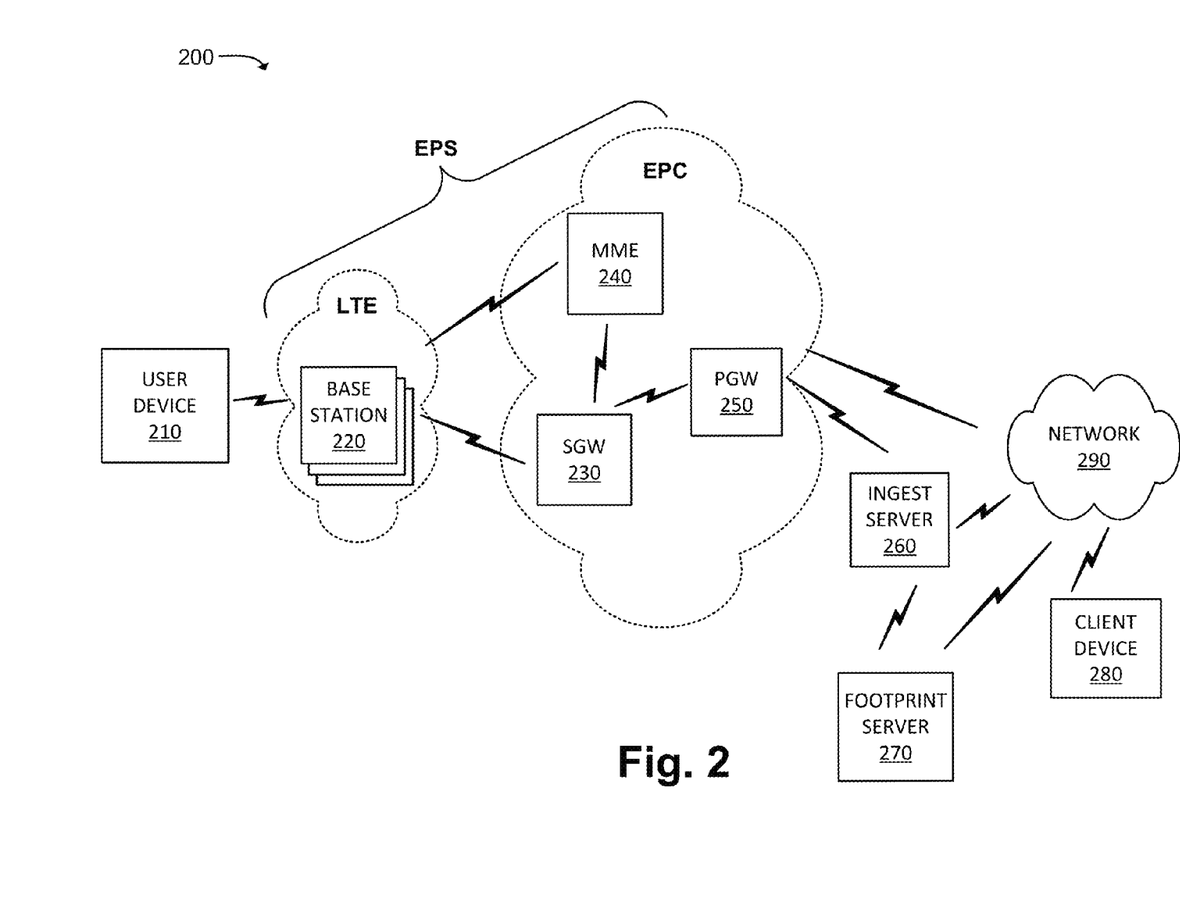
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, base station 220, serving gateway 230 (hereinafter referred to as "SGW 230"), mobility management entity device 240 (hereinafter referred to as "MME 240"), packet data network (PDN) gateway 250 (hereinafter referred to as "PGW 250"), ingest server 260, footprint server 270, client device 280, and network 290. Devices of environment 200 may interconnect via wired connections, wireless connections, or a combination of wired and wireless connections.

Environment 200 may include an evolved packet system (EPS) having a long term evolution (LTE) network and/or an evolved packet core (EPC) that operates based on a third generation partnership project (3GPP) wireless communication standard. The LTE network may be a radio access network (RAN) that includes one or more base stations 220, such as eNodeBs (eNBs), via which user device 210 communicates with the EPC. The EPC may include SGW 230, MME 240, and/or PGW 250 that enables user device 210 to communicate with network 290 and/or an Internet protocol (IP) multimedia subsystem (IMS) core. The LTE network may include multiple base stations 220, and the EPC may include multiple SGWs 230, MMEs 240, and/or PGWs 250.

User device 210 may include one or more mobile (or portable) devices or systems capable of sending/receiving data to/from base station 220. User device 210 may include, for example, wireless devices or systems that are portable, such as wireless telephones, personal digital assistants (PDAs), smart phones, laptop computers, tablet computers, etc.

Base station 220 may include one or more devices, such as an eNodeB device, that receive voice and/or data from MME 240, SGW 230, and/or another device and transmit that voice and/or data to user device 210 via an air interface. Base station 220 may also include one or more devices that receive voice and/or data from user device 210 over an air interface and transmit that voice and/or data to MME 240, SGW 140, and/or another device (such as another user device 210).

SGW 230 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, SGW 230 may route and forward traffic from user device 210, may act as a mobility anchor for a user plane during inter-base station handovers, and may act as an anchor for mobility between LTE and other 3GPP technologies.

MME 240 may include one or more devices that manage mobility, user device 210 identities, and security parameters. MME 240 may perform one or more of the following functions: non-access stratum (NAS) signaling; NAS signaling security; security control; inter-core network signaling for mobility between 3GPP access networks; idle mode user device 210 reachability; tracking area list management (user device 210 in idle and active modes); handovers to and/or from the LTE network; roaming; traffic policing functions; authentication operations; bearer management functions; etc.

PGW 250 may include one or more devices that act as a gateway for additional networks, such as network 290. In other words, PGW 250 may provide connectivity from user device 210 to external packet data networks by being the point of exit and entry of traffic for user device 210. PGW 250 may perform policy enforcement, packet filtering, and/or other services relating to the access of user device 210 to the external packet data network. Additionally, or alternatively, PGW 250 may receive internet protocol flow information export (IPFIX) data relating to the performance of base station 220, such as network outage data, network speed data, network latency data, etc. associated with base station 220.

Ingest server 260 may include a computing device, such as a server device or a collection of server devices. In some implementations, ingest server 260 may receive data regarding user device 210 (e.g., from PGW 250), such as a mobile device number (MDN) of user device 210, a timestamp relating to when user device 210 connects to particular base station 220, and/or some other information regarding user device 210. Additionally, or alternatively, ingest server 260 may receive IPFIX data and/or performance data regarding base station 220. In some implementations, ingest server 260 may generate a performance value for base station 220 based on the performance data.

Footprint server 270 may include a computing device, such as a server device or a collection of server devices. In some implementations, footprint server 270 may receive information regarding user device 210, such as an MDN of user device 210, a timestamp relating to when user device 210 connects to particular base station 220, and/or some other information regarding user device 210. Footprint server 270 may store the information regarding user device 210 to identify connection durations between user device 210 and base station 220 during a particular time interval. In some implementations, footprint server 270 may generate a footprint map to display a graphical representation of a connection duration between user device 210 and base station 220. Additionally, or alternatively, footprint server 270 may generate a chart to organize and display information relating to a connection duration between user device 210 and base station 220 during a particular time period.

Client device 280 may include one or more portable or non-portable devices or systems capable of sending/receiving data to/from network 290. Client device 280 may include, for example, wireless devices or systems that are portable, such as wireless telephones, personal digital assistants (PDAs), smart phones, laptop computers, tablet computers, etc. Additionally, or alternatively, client device 280 may include non-portable devices, such as desktop computers, rack-mountable servers, etc. In some implementations, client device 280 may provide a footprint query regarding user device 210 to footprint server 270, and may receive a footprint response from footprint server 270.

Network 290 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200.

Figure 3:
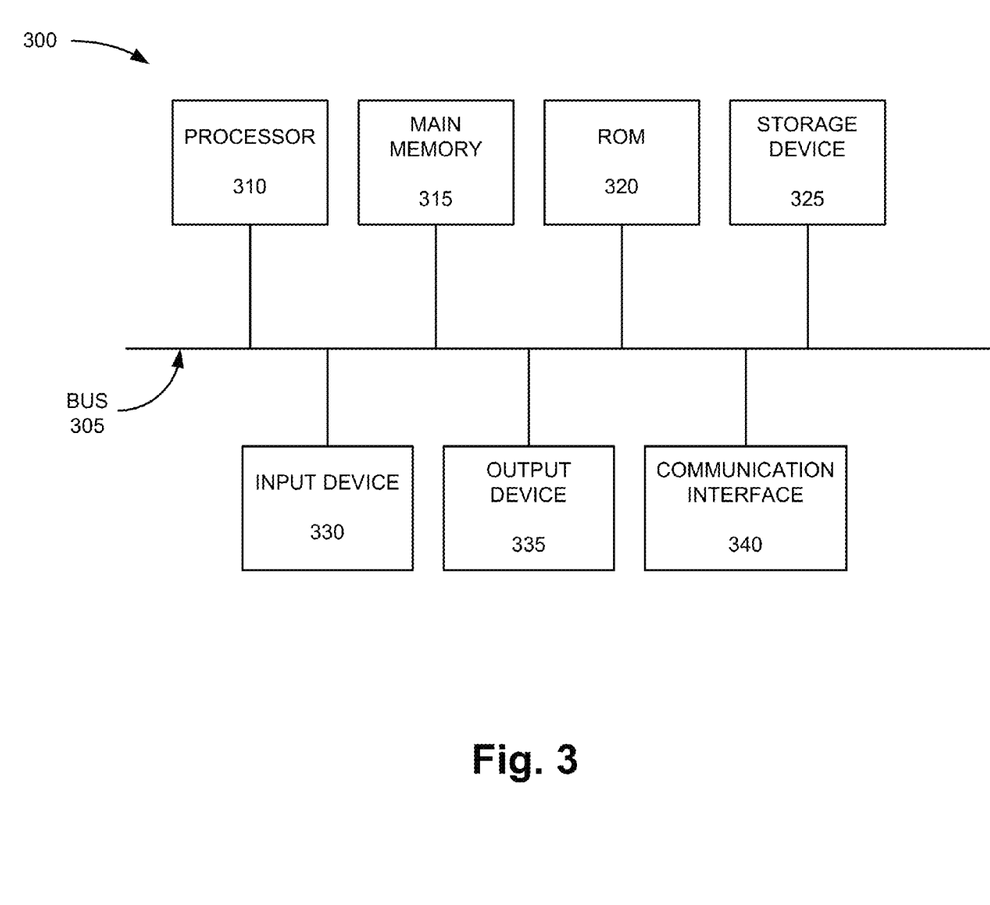
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, PGW 250, ingest server 260, footprint server 270, and/or client device 280. Each of user device 210, base station 220, SGW 230, MME 240, PGW 250, ingest server 260, footprint server 270, and/or client device 280 may include one or more devices 300, and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
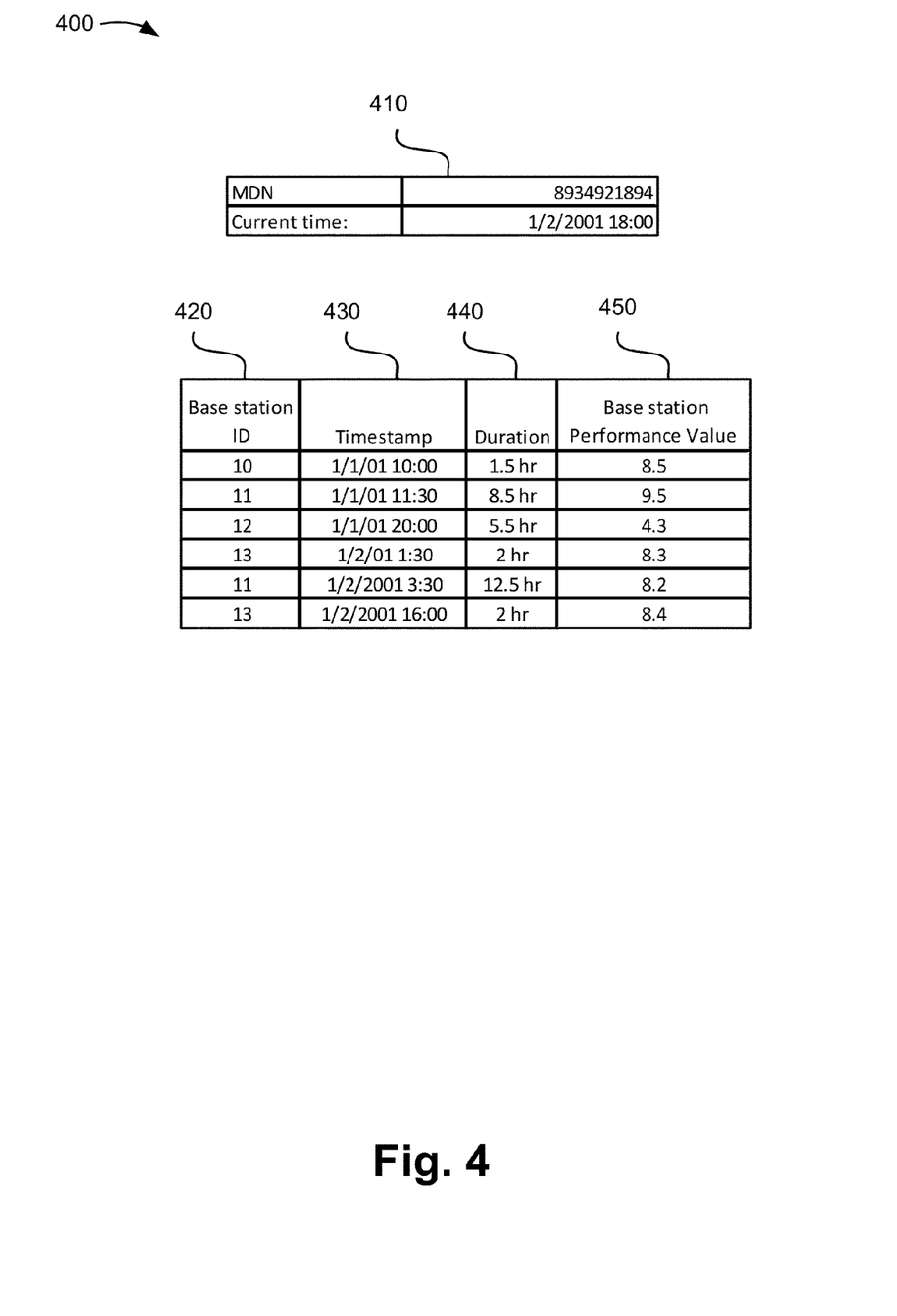
FIG. 4 illustrates example data structure that may be stored by one or more devices in the environment of FIG. 2.

FIG. 4 illustrates an example data structure 400 that may be stored by one or more devices in environment 200, such as footprint server 270. In one implementation, data structure 400 may be stored in a memory of footprint server 270. In another implementation, data structure 400 may be stored in a memory separate from, but accessible by footprint server 270. In some implementations, data structure 600 may be stored by some other device in environment 200, such as SGW 230, MME 240, PGW 250, and/or ingest server 260.

A particular instance of data structure 400 may contain different information and/or fields than another instance of data structure 400. In some implementations, data structure 400 may correspond to footprint information based on data received by ingest server 260. One instance of data structure 400 may store footprint information regarding one user device 210 in environment 200, whereas another instance of data structure 400 may store footprint information regarding another user device 210 in environment 200.

As shown in FIG. 4, data structure 400 may include header field 410, base station ID field 420, timestamp field 430, duration field 440, and base station performance value field 450. In some implementations, data structure 400 may include additional fields, fewer fields, different fields, or differently arranged fields than are shown in FIG. 4.

Header field 410 may store information regarding a particular user device 210 with which a particular instance of data structure 400 is associated. For example, header field 410 may store information identifying user device 210, such as a mobile device number (MDN), a subscriber identity module (SIM) card number, or some other identifier associated with user device 210. As shown in FIG. 4, an example data structure 400 may be associated with the user device 210 having the MDN of "8934921894." Another data structure 400 may be associated with another user device 210 having some other MDN. Additionally, header field 410 may store information regarding a current time. As shown in FIG. 4, header field 410 may store a date and time, such as: Jan. 2, 2001, 18:00.

Base station identifier (ID) field 420 may store information identifying particular base stations 220 in which user device 210 may have connected with in order to perform some task (e.g., send and/or receive e-mails, browse the internet, place a telephone call, etc.). While a particular format of base station IDs are shown in FIG. 4, in practice, base station ID field 420 may store information identifying base stations 220 in any format and of any length of characters.

Timestamp field 430 may store information identifying a time in which user device 210 connects with a particular base station 220 (e.g., when user device 210 enters a geographic region associated with base station 220 and connects to base station 220). In an example shown in FIG. 4, timestamp field 430 may store information indicating that user device 210 connected to the base station 220 having the base station ID of "10" on Jan. 1, 2001 at 10:00.

Duration field 440 may store information identifying a connection duration between user device 210 and base station 220. In some implementations, information stored by duration field 440 may be generated based on information stored by timestamp field 430. In an example shown in FIG. 4, duration field 440 may store information identifying a connection duration of 1.5 hours relating to a connection duration between user device 210 and base station 220 having the base station ID of "10" based on the difference between the timestamp of "Jan. 1, 2001 10:00" (e.g., the timestamp indicating when user device 210 connected to the base station 220 having the base station ID of "10") and the timestamp of "Jan. 1, 2001 11:30" (e.g., the timestamp indicating when user device 210 disconnected from the base station 220 having the base station ID of "10"). In some implementations, the last entry in data structure 400 may indicate the particular base station 220 with which user device 210 is currently connected. Duration field 440 may store a time duration based on information stored by timestamp field 430 and based on a current time (e.g., as identified by header field 410).

Base station performance value field 450 may store information identifying a performance value for a corresponding base station 220. In some implementations, and as described above, ingest server 260 may communicate with PGW 250 to receive performance data associated with base station 220, such as network outage data, network latency data, network speed data, etc. In some implementations, ingest server 260 may generate a performance value for base station 220 based on the received performance data. For example, ingest server 260 may generate a performance value on a relative scale of 1-10 (or some other scale), where 10 indicates highest performance of base station 220. In some implementations, instances of network outages above a particular threshold, network latency above a particular threshold, and network speed below a particular threshold may reduce the performance value of base station 220. Additionally, instances of network outages below a particular threshold, network latency below a particular threshold, and network speed above a particular threshold may increase the performance value of base station 220.

In some implementations, ingest server 260 may provide the performance value for base station 220 such that footprint server 270 may store the performance value in base station performance value field 450. In an example shown in FIG. 4, base station performance value field 450 may store the number "8.5" associated with the base station 220 having the base station ID of "10." In some implementations, the performance value may update in real-time and may vary based on a particular time period.

Figure 5:
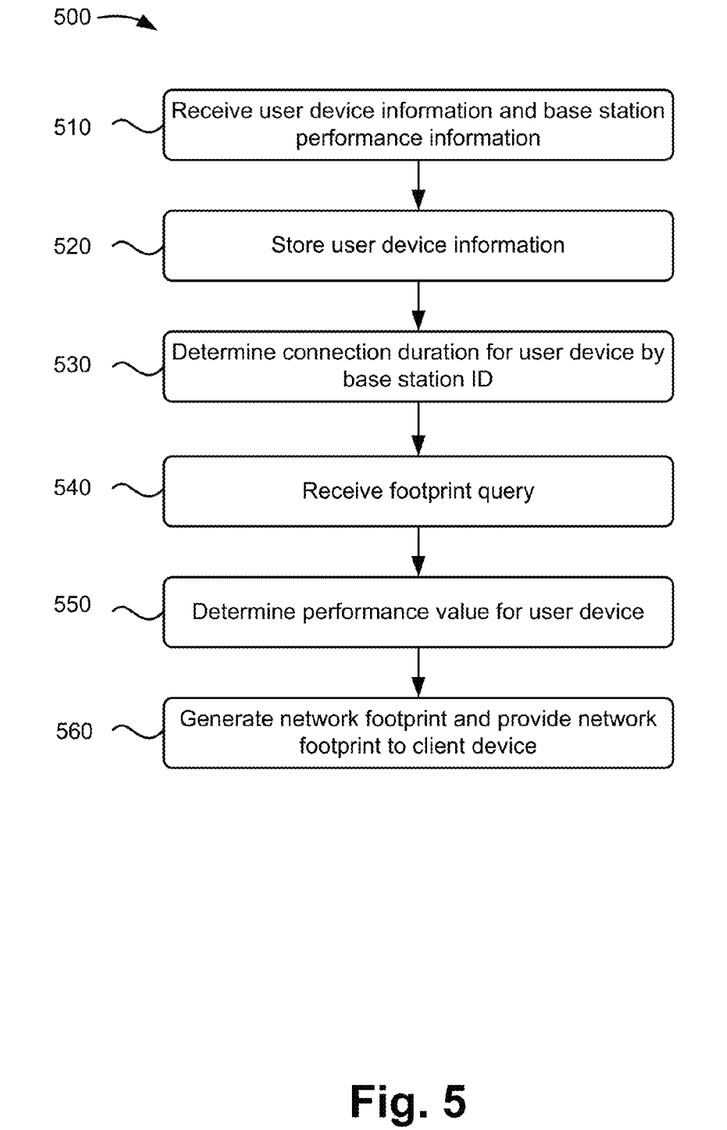
FIG. 5 illustrates a flowchart of an example process for generating a footprint map.

FIG. 5 illustrates a flowchart of an example process 500 for generating a footprint map. In one implementation, process 500 may be performed by one or more components of footprint server 270. In another implementation, some or all of blocks of process 500 may be performed by one or more components of another device in environment 200 (e.g., SGW 230, MME 240, PGW 250, server 260, and/or client device 280), or a group of devices including or excluding footprint server 270.

Process 500 may include receiving user device information and base station performance information (block 510). For example, footprint server 270 may receive information regarding user device 210 (e.g., from ingest server 260), such an MDN of user device 210, an identifier of particular base stations 220 in which user device 210 connects with, timestamps relating to when user device 210 connects to base stations 220, and/or some other information regarding user device 210. Additionally, footprint server 270 may receive base station performance information from ingest server 260, as described above.

Process 500 may further include storing the user device information (block 520). For example, footprint server 270 may store the information regarding user devices 210 in accordance with data structure 400. Footprint server 270 may use the user device information to identify when user device 210 connects with particular base stations 220 and the duration of time in which user device 210 connects with base stations 220.

Process 500 may also include determining the connection duration of user device by base station ID (block 530). For example, footprint server 270 may determine the connection duration between user device 210 and each identified base station 220 based on information stored by data structure 400. As described above, footprint server 270 may determine that the connection duration between user device 210 and each base station 220 based on the difference between the timestamps indicating when user device 210 connects to a particular base station 220 and connects to another base station 220.

Process 500 may further include receiving a footprint query (block 540). For example, footprint server 270 may receive a footprint query from client device 280. In some implementations, the footprint query may include an MDN for a particular user device 210 and may include a time period. In some implementations, the time period may correspond to travel patterns of a user, associated with particular user device 210 (e.g., commuting patterns, vacation patterns, etc.) Additionally, or alternatively, the footprint query may include a request for a network footprint (e.g., a request for a performance value and/or a request for a footprint map) associated with the particular user device 210 having the MDN.

Process 500 may also include determining a performance value for the particular user device (block 550). For example, footprint server 270 may calculate the performance of particular user device 210 associated with the MDN of the footprint query. As described above, the performance of user device 210 may be based on the performance of base stations 220 with which user device 210 connected and the connection duration with which user device 210 was connected to the base stations during the time period associated with the footprint query. For example, footprint server 270 may generate a performance value of user device 210 based on a formula (e.g., $CD_1*PV_1+CD_2*PV_2+\ldots CD_N*PV_N/(CD_1+CD_2+\ldots CD_N)$), where $N \geq 1$, $CD_1$ is the connection duration between user device 210 and base station 220-1, $PV_1$ is the performance value of base station 220-1, $CD_N$ is the connection duration between user device 210 and base station 220-N, and $PV_N$ is the performance value of base station 220-N). In some implementations, footprint server 270 may generate a performance value of user device 210 based on some other technique, formula, or algorithm.

In an example implementation, assume that user device 210 connects to a first base station 220 (e.g., base station 220-1) for 8 hours and connects to a second base station 220 (e.g., base station 220-2) for 2 hours during a ten hour time period associated with the footprint query. Further assume that the performance value for base station 220-1 is a value of 9 (e.g., on a scale from 1-10), and that the performance value for base station 220-2 is a value of 6. Footprint server 270 may determine a performance value of 8.4 (e.g., (8 hours*9+2 hours*6)/10 hours).

Process 500 may further include generating a network footprint and providing the network footprint to the client device (block 560). For example, footprint server 270 may generate a network footprint in the form of a footprint map for user device 210 associated the MDN of the footprint query for the time period associated with the footprint query. In some implementations, the network footprint may include a performance value of user device 210. Additionally, or alternatively, the network footprint may include a map with a graphical representation of connection durations between user device 210 and particular base stations 220. Additionally, or alternatively, the network footprint may be generated in the form of a chart, a spreadsheet, or some other format (e.g., in accordance with data structure 400).

Figure 6:
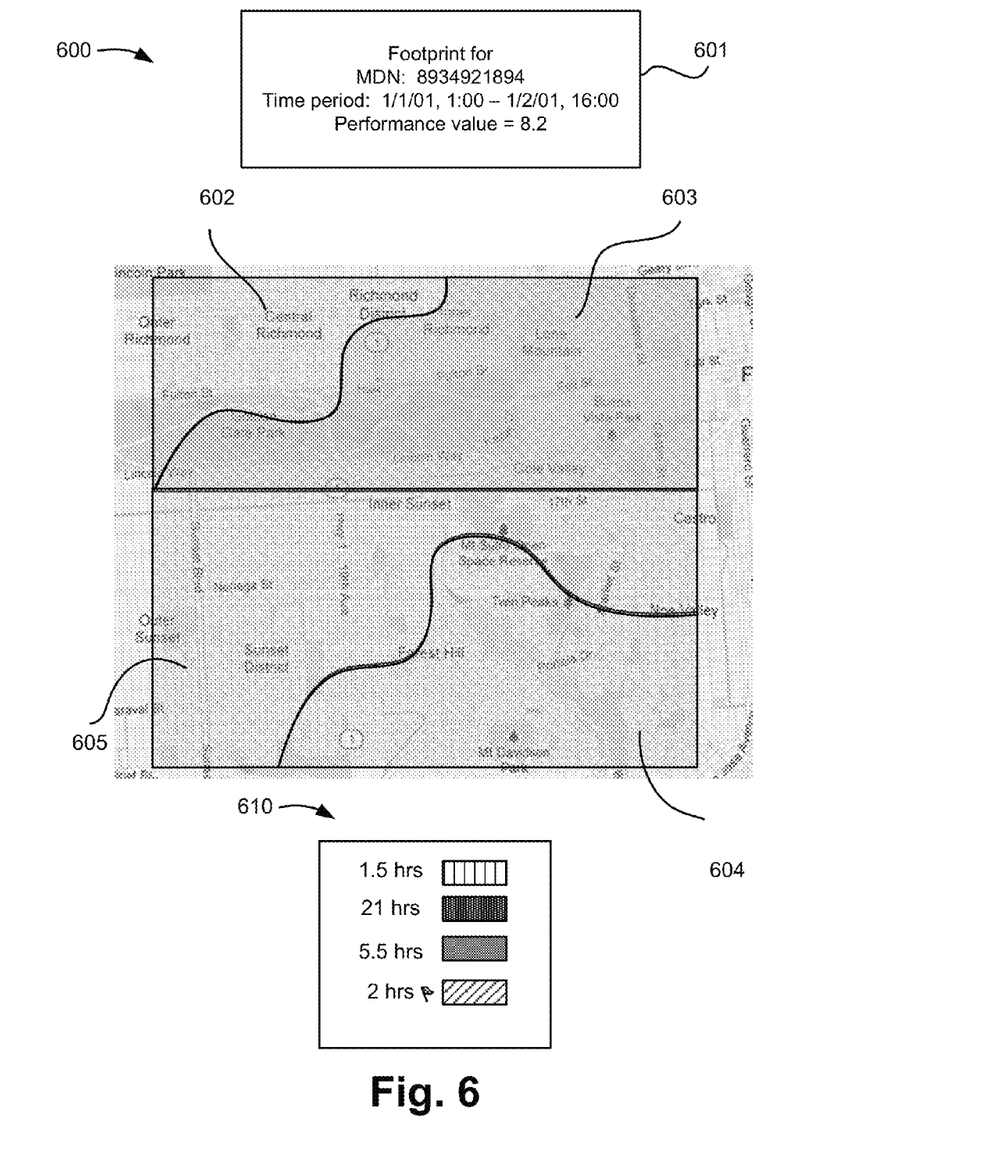
FIG. 6 illustrates an example network footprint that may be provided to a client device.

FIG. 6 illustrates an example network footprint that may be provided to a client device 280. In some implementations, FIG. 6 may correspond to a graphical representation of a network footprint in the form of footprint map 600 generated by footprint server 270. In some implementations, footprint map 600 may be received and/or displayed by client device 280. As shown in FIG. 6, footprint map 600 may include header 601, regions 602-605, and legend 610. Header 601 may include information regarding footprint 600, such as an MDN for the particular user device 210 with which footprint 600 is associated, the time period with which footprint 600 is associated, and a performance value for user device 210 during the time period of footprint 600.

In some implementations, each one of regions 602-605 may correspond to a geographical connection region of a particular base station 220. While a specific number of regions are shown in FIG. 6, in practice, footprint map 600 may include any number of regions corresponding to different base stations 220. As further shown in FIG. 6, footprint 600 may include legend 610 to indicate connection durations between base stations 220 associated with regions 602-605 and user device 210. For example, as shown in FIG. 6, region 602 may be associated with base station 220-1 and may include a vertical-line pattern to indicate a connection duration of 1.5 hours between base station 220-1 and user device 210.

As further shown in FIG. 6, region 602 may be associated with base station 220-2 and may include a diagonal-line pattern to indicate a connection duration of 2 hours between base station 220-2 and user device 210.

Additionally, or alternatively, the connection duration between user device 210 and base station 220-1 with respect to the connection duration between user device 210 and base station 220-2 may be represented by a particular pattern, a particular color, or some other indication on the footprint map. For example, a darker shade of red may indicate a longer connection duration than a lighter shade of red. Additionally, or alternatively, a particular color may identify connection strength between user device 210 and base station 220. For example, a strong connection between user device 210 and base station 220 may be indicated by a particular color and a weak connection between user device 210 and baste station 220 may be indicated by some other color.

In some implementations, footprint map 600 may include an indication to identify a current geographic region of user device 210 based on a current connection between user device 210 and base station 220 associated with the geographic region. For example, as shown in FIG. 6, footprint map 600 may include a flag, or some other indication, to identify that user device 210 is currently connected to the base station 220 associated with region 604 and that user device 210 is currently associated with the geographic region represented by region 604 on footprint map 600.

In some implementations, a user, associated with user device 210, may interact with footprint map 600 via user device 210. For example, a user may zoom in and/or zoom out on footprint map 600 to display a network footprint for a particular geographic region.

While a specific format of the footprint map is shown in FIG. 6 and described above, in practice, the format of the footprint map may be different in appearance and style. For example, the selection of colors, patterns, and/or other indications associated with connection durations may be modified and may differ than what is described above and shown in FIG. 6. Further, footprint map 600 may include additional information not shown in FIG. 6, such as geographic coordinates associated with regions 602-605 which may correspond to geographic service/coverage areas of respective base stations 220.

As described above, client device 280 may receive a network footprint for a particular user device 210. In some implementations, troubleshooting, network diagnostics, and/or service quality metrics may be determined based on information regarding the network footprint of user device 210 and/or information regarding the network performance of user device 210. For example, base stations 220 having long connection durations with user devices 210 may be prioritized for network upgrades over base stations 220 having short connection durations with user device 210. Additionally, or alternatively, the most active and/or most recent base stations 220 to which user device 210 connects may be determined and ranked based on information provided by the network footprint (e.g., a frequency in which user device 210 connects with particular base stations 220 and/or time durations in which user device 210 connects with base stations 220).

As a result, client device 280 may receive network footprints and/or performance values for individual user devices 210, thereby allowing for troubleshooting, network diagnostics, service quality metrics, usage analysis, etc. based on the network footprints and/or performance values. For example, individual user devices 210 having poor performance values may be identified such that the poor performance values may be rectified (e.g., by improving the performance of base stations 220 with which user devices 210 connect).

The foregoing description provides illustration and description, but is not intended to be exhaustive or to limit the possible implementations to the precise form disclosed. Modifications and variations are possible in light of the above disclosure or may be acquired from practice of the implementations. For example, while the above description focused on determine a network footprint in relation to an LTE network, implementations, described herein, are equally applicable to other wireless networks, such as other types of cellular networks, wireless fidelity (WiFi) networks, and the like.

While a series of blocks have been described with regards to FIG. 5, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first server, information regarding a user device from a second server;
   storing, by the first server, the information regarding the user device to form device data,
   the device data including a list of one or more timestamps indicating a time at which the user device connects to one or more network devices;
   determining, by the first server, one or more connection durations based on the device data,
   each connection duration, of the one or more connection durations, indicating an amount of time that the user device is connected to one of the one or more network devices;

receiving, by the first server and from the second server, performance data associated with each one of the one or more network devices;

receiving, by the first server and from a client device, a query including a request for a performance indicator of the user device;

generating, by the first server, the performance indicator based on the performance data, associated with the each one of the one or more network devices, and based on the one or more connection durations; and providing, by the first server, the performance indicator to the client device based on receiving the query.

2. The method of claim 1, where determining the one or more connection durations includes:

determining a difference between a first timestamp, of the one or more timestamps, and a second timestamp, of the one or more timestamps.

3. The method of claim 1, where the each one of the one or more network devices is associated with a different geographic region, and where the query includes a request for a map associated with a geographic connection profile of the user device, the method further comprising:

generating the map based on the one or more connection durations corresponding to the each one of the one or more network devices, the map including information regarding the one or more connection durations associated with the geographic regions corresponding to the each one of the one or more network devices; and providing the map to the client device based on receiving the query.

4. The method of claim 3, further comprising:

determining a current geographic region, associated with the user device, based on a current connection between the user device and the one or more network devices, and where generating the map includes:

generating an indication, on the map, indicating the current geographic region associated with the user device.

5. The method of claim 1, where the one or more network devices comprise one or more base stations associated with a cellular network.

6. The method of claim 1, where the performance data, associated with the each one of the one or more network devices, includes one or more of:

a value relating to network latency, a value relating to a network speed, or a value relating to a network outage.

7. The method of claim 1, where receiving the query includes:

receiving information identifying a time period, and where generating the performance indicator includes:

generating the performance indicator based on the performance data, associated with the each one of the one or more network devices, and based on the one or more connection durations corresponding to each one of the one or more network devices during the time period.

8. A system comprising:

a first server to:

receive information associated with a user device, the information associated with the user device being received from a second server;

store the information associated with the user device to form device data, the device data including a list of one or more timestamps indicating a time at which the user device connects to one or more network devices, each one of the one or more network devices being associated with a different geographic region;

determine one or more connection durations based on the device data, each one of the one or more connection durations corresponding to an amount of time that the user device is connected to one of the one or more network devices;

receive, from a client device, a query including a request for a map associated with a geographic connection profile of the user device;

generate the map based on the one or more connection durations corresponding to the each one of the one or more network devices, the map including information regarding the one or more connection durations associated with the geographic regions corresponding to the each one of the one or more network devices; and provide the map to the client device based on receiving the query from the client device.

9. The system of claim 8, where the first server is further to:

determine a current geographic region, associated with the user device, based on a current connection between the user device and the one or more network devices, where when generating the map, the first server is further to:

generate an indication on the map relating to the current geographic region associated with the user device.

10. The system of claim 8, where, when determining the one or more connection durations, the first server is further to:

determine the one or more connection durations based on a difference between a first timestamp, of the one or more timestamps, and a second timestamp of the one or more timestamps.

11. The system of claim 8, where the query includes a request for a performance indicator of the user device, and where the first server is further to:

receive, from the second server, performance data associated with the each one of the one or more network devices;

generate the performance indicator based on the performance data, associated with the each one of the one or more network devices, and based on the one or more connection durations corresponding to the each one of the one or more network devices; and provide the performance indicator to the client device based on receiving the query from the client device.

12. The system of claim 8, where the one or more network devices include one or more base stations associated with a cellular network.

13. The system of claim 8, where the performance data, associated with the each one of the one or more network devices, includes one or more of:

a value relating to network latency, a value relating to a network speed, or a value relating to a network outage.

14. The system of claim 8, where, when receiving the query, the first server is further to:

receive information indicating a particular time period, and where, when generating the map, the first server is further to:

generate the map based on the performance data, associated with the each one of the one or more network devices, and based on the one or more connection durations corresponding to the each one of the one or more network devices during the particular time period.

15. A non-transitory computer-readable medium for storing instructions, the instructions comprising:
   one or more instructions which, when executed by one or more processors associated with a first server, cause the one or more processors to:
      receive information regarding a user device from a second server;
      store the information regarding the user device to form device data,
         the device data including information identifying one or more timestamps indicating a time at which the user device connects to one or more network devices,
            each one of the one or more network devices being associated with a corresponding geographic region of a plurality of geographic regions;
      determine one or more connection durations based on the device data,
         each one of the one or more connection durations corresponding to an amount of time that the user device is connected to one of the one or more network devices;
      receive, from the second server, performance data associated with the each one of the one or more network devices;
      receive, from a client device, a query including a request for a map, associated with a geographic connection profile of the user device, and a request for a performance indicator associated with the user device;
      generate the map based on the one or more connection durations corresponding to the each one of the one or more network devices,
         the map including information regarding the one or more connection durations associated with the corresponding geographic region corresponding to the each one of the one or more network devices;
      generate the performance indicator based on the performance data, associated with the each one of the one or more network devices, and based on the one or more connection durations corresponding to the each one of the one or more network devices; and
      provide the map and the performance indicator to the client device based on receiving the query from the client device.

16. The non-transitory computer-readable medium of claim 15, where the instructions further comprise:
   one or more instructions which, when executed by the one or more processors, cause the one or more processors to:
      determine a current geographic region, associated with the user device, based on a current connection between the user device and the one or more network devices,
   where the one or more instructions to generate the map include:
      one or more instructions which, when executed by the one or more processors, cause the one or more processors to:
         generate an indication on the map relating to the current geographic region associated with the user device.

17. The non-transitory computer-readable medium of claim 15, where the one or more instructions to determine the one or more connection durations include:
   one or more instructions which, when executed by the one or more processors, cause the one or more processors to:
      determine the one or more connection durations based on a difference between a first timestamp, of the one or more timestamps, and a second timestamp of the one or more timestamps.

18. The non-transitory computer-readable medium of claim 15, where the one or more network devices include a base station.

19. The non-transitory computer-readable medium of claim 15, where the one or more instructions to receive the performance data include:
   one or more instructions which, when executed by the one or more processors, cause the one or more processors to:
      receive information identifying one or more of:
         a value relating to network latency,
         a value relating to a network speed, or
         a value relating to a network outage.

20. The non-transitory computer-readable medium of claim 15, where the one or more instructions to receive the query include:
   one or more instructions which, when executed by the one or more processors, cause the one or more processors to:
      receive information regarding a time period, and
   where the one or more instructions to generate the map include:
      one or more instructions which, when executed by the one or more processors, cause the one or more processors to:
         generate the map based on the performance data, associated with the each one of the one or more network devices, and based on the one or more connection durations corresponding to the each one of the one or more network devices during the time period.

* * * * *